(12) United States Patent
Hyslop

(10) Patent No.: US 12,231,918 B2
(45) Date of Patent: *Feb. 18, 2025

(54) WEDGE SHAPED CELLS IN A WIRELESS COMMUNICATION SYSTEM

(71) Applicant: SMARTSKY NETWORKS LLC, Morrisville, NC (US)

(72) Inventor: Douglas Hyslop, Vienna, VA (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/527,561

(22) Filed: Dec. 4, 2023

(65) Prior Publication Data
US 2024/0114354 A1  Apr. 4, 2024

Related U.S. Application Data

(63) Continuation of application No. 18/075,752, filed on Dec. 6, 2022, now Pat. No. 11,838,768, which is a
(Continued)

(51) Int. Cl.
*H04W 40/00* (2009.01)
*H04B 7/185* (2006.01)
(Continued)

(52) U.S. Cl.
CPC ........ *H04W 16/30* (2013.01); *H04B 7/18506* (2013.01); *H04W 16/12* (2013.01);
(Continued)

(58) Field of Classification Search
CPC ..... H04W 16/30; H04W 16/12; H04W 16/24; H04W 36/32; H04W 88/08; H04B 7/18506
(Continued)

(56) References Cited

U.S. PATENT DOCUMENTS

| | | |
|---|---|---|
| 5,365,516 A | 11/1994 | Jandrell |
| 5,444,762 A | 8/1995 | Frey et al. |
| | (Continued) | |

FOREIGN PATENT DOCUMENTS

| | | |
|---|---|---|
| CN | 1208540 A | 2/1999 |
| CN | 101176367 A | 5/2008 |
| | (Continued) | |

OTHER PUBLICATIONS

International Search Report and Written Opinion of corresponding application No. PCT/US2014/017273, mailed Jun. 6, 2014, all enclosed pages cited.

(Continued)

*Primary Examiner* — Amancio Gonzalez
(74) *Attorney, Agent, or Firm* — Burr & Forman LLP

(57) ABSTRACT

Aspects described herein relate to a network for providing air-to-ground wireless communication in various cells. The network includes a first base station array, each base station of which includes a respective first antenna array defining a directional radiation pattern that is oriented in a first direction, wherein each base station of the first base station array is disposed spaced apart from another base station of the first base station array along the first direction by a first distance. The network also includes a similar second base station array where the second base station array extends substantially parallel to the first base station array and is spaced apart from the first base station array by a second distance to form continuous and at least partially overlapping cell coverage areas between respective base stations of the first and second base station arrays.

20 Claims, 5 Drawing Sheets

Related U.S. Application Data continuation of application No. 17/192,390, filed on Mar. 4, 2021, now Pat. No. 11,533,639, which is a continuation of application No. 16/983,167, filed on Aug. 3, 2020, now Pat. No. 10,972,919, which is a continuation of application No. 16/822,661, filed on Mar. 18, 2020, now Pat. No. 10,771,984, which is a continuation of application No. 16/281,638, filed on Feb. 21, 2019, now Pat. No. 10,623,968, which is a continuation of application No. 15/877,625, filed on Jan. 23, 2018, now Pat. No. 10,257,717, which is a continuation of application No. 15/345,527, filed on Nov. 8, 2016, now Pat. No. 9,913,149, which is a continuation of application No. 15/017,794, filed on Feb. 8, 2016, now Pat. No. 9,503,912, which is a continuation of application No. 14/681,429, filed on Apr. 8, 2015, now Pat. No. 9,294,933, which is a continuation of application No. 13/832,385, filed on Mar. 15, 2013, now Pat. No. 9,008,669.

(51) Int. Cl.
*H04W 16/12* (2009.01)
*H04W 16/24* (2009.01)
*H04W 16/30* (2009.01)
*H04W 36/32* (2009.01)
*H04W 88/08* (2009.01)

(52) U.S. Cl.
CPC ......... *H04W 16/24* (2013.01); *H04W 36/328* (2023.05); *H04W 88/08* (2013.01)

(58) Field of Classification Search
USPC ........................................................ 455/446
See application file for complete search history.

(56) References Cited

U.S. PATENT DOCUMENTS

| | | | |
|---|---|---|---|
| 5,557,656 A | 9/1996 | Ray et al. | |
| 5,740,166 A | 4/1998 | Ekemark et al. | |
| 5,878,345 A | 3/1999 | Ray et al. | |
| 6,108,539 A | 8/2000 | Ray et al. | |
| 6,330,459 B1 | 12/2001 | Crichton et al. | |
| 6,336,034 B1 | 1/2002 | Yamura et al. | |
| 6,560,459 B1 * | 5/2003 | Wong | H04W 16/12 455/447 |
| 6,618,016 B1 | 9/2003 | Hannan et al. | |
| 7,107,062 B2 | 9/2006 | Cruz et al. | |
| 7,565,144 B2 | 7/2009 | Saifullah et al. | |
| 7,640,016 B2 * | 12/2009 | Cruz | H04W 16/12 701/8 |
| 7,920,860 B2 | 4/2011 | Chari et al. | |
| 7,933,598 B1 | 4/2011 | Agrawal et al. | |
| 8,027,667 B2 * | 9/2011 | Mechaley, Jr. | H04L 67/52 705/14.1 |
| 8,081,969 B2 | 12/2011 | Lauer et al. | |
| 8,145,208 B2 * | 3/2012 | Chari | H01Q 9/0435 455/562.1 |
| 8,340,628 B2 * | 12/2012 | Taylor | H04W 4/021 455/404.1 |
| 8,442,519 B2 | 5/2013 | Cruz et al. | |
| 8,447,292 B2 * | 5/2013 | Chari | H01Q 9/32 455/448 |
| 8,666,451 B2 * | 3/2014 | Engstrom | H04W 16/28 455/562.1 |
| 8,744,360 B2 | 6/2014 | Zheng | |
| 8,848,605 B2 * | 9/2014 | Ohm | H04B 7/185 455/12.1 |
| 8,914,022 B2 * | 12/2014 | Kostanic | H04W 16/28 455/431 |
| 9,008,669 B2 | 4/2015 | Hyslop et al. | |
| 9,282,423 B2 | 3/2016 | Luna | |
| 9,294,933 B2 | 3/2016 | Hyslop et al. | |
| 9,503,912 B2 | 11/2016 | Hyslop et al. | |
| 9,913,149 B2 | 3/2018 | Hyslop | |
| 10,257,717 B2 | 4/2019 | Hyslop | |
| 10,680,315 B2 | 6/2020 | Cordone | |
| 11,533,639 B2 | 12/2022 | Hyslop | |
| 11,838,768 B2 * | 12/2023 | Hyslop | H04W 16/12 |
| 2003/0160719 A1 | 8/2003 | Hancock | |
| 2006/0019710 A1 | 1/2006 | Ylitalo | |
| 2006/0030311 A1 | 2/2006 | Cruz et al. | |
| 2006/0084474 A1 | 4/2006 | Iacono et al. | |
| 2006/0229103 A1 | 10/2006 | Monk | |
| 2007/0042773 A1 | 2/2007 | Alcorn | |
| 2008/0102813 A1 | 5/2008 | Chari et al. | |
| 2008/0234930 A1 | 9/2008 | Cheok et al. | |
| 2010/0124210 A1 | 5/2010 | Lo | |
| 2011/0032149 A1 | 2/2011 | Leabman | |
| 2011/0309979 A1 | 12/2011 | Redford et al. | |
| 2012/0200458 A1 | 8/2012 | Jalali et al. | |
| 2019/0182684 A1 | 6/2019 | Hyslop | |

FOREIGN PATENT DOCUMENTS

| | | |
|---|---|---|
| CN | 101536566 A | 9/2009 |
| WO | 9814024 A1 | 4/1998 |
| WO | 2005120017 A1 | 12/2005 |
| WO | 2011017576 A2 | 2/2011 |
| WO | 2011071470 A1 | 6/2011 |
| WO | 2013089731 A1 | 6/2013 |

OTHER PUBLICATIONS

Extended Search Report and Written Opinion of corresponding European application No. 14768874.1 mailed Sep. 21, 2016, all enclosed pages cited.

Examination report from corresponding European application No. 14768874.1 mailed Jul. 12, 2017, all enclosed pages cited.

Office action from corresponding Chinese application No. 201480027257.4 mailed Feb. 6, 2018, all enclosed pages cited.

Office action from corresponding Chinese application No. 201480027257.4 mailed Jun. 29, 2018, all enclosed pages cited.

Extended Search Report and Written Opinion of corresponding European application No. 19161507.9 mailed Jun. 12, 2019, all enclosed pages cited.

* cited by examiner

WEDGE SHAPED CELLS IN A WIRELESS COMMUNICATION SYSTEM

CROSS-REFERENCE TO RELATED APPLICATIONS

This application is a continuation of U.S. application Ser. No. 18/075,752 filed on Dec. 6, 2022, which is a continuation of U.S. application Ser. No. 17/192,390 filed on Mar. 4, 2021 (now patented as U.S. Pat. No. 11,533,639 which issued on Dec. 20, 2022), which is a continuation of Ser. No. 16/983,167 filed on Aug. 3, 2020 (now patented as U.S. Pat. No. 10,972,919 which issued on Apr. 6, 2021), which is a continuation of U.S. application Ser. No. 16/822,661 filed on Mar. 18, 2020 (now patented as U.S. Pat. No. 10,771,984 which issued on Sep. 8, 2020), which is a continuation of U.S. application Ser. No. 16/281,638 filed on Feb. 21, 2019 (now patented as U.S. Pat. No. 10,623,968 which issued on Apr. 14, 2020), which is a continuation of U.S. application Ser. No. 15/877,625 filed on Jan. 23, 2018 (now patented as U.S. Pat. No. 10,257,717 which issued on Apr. 9, 2019) which is a continuation of U.S. application Ser. No. 15/345,527 filed Nov. 8, 2016 (now patented as U.S. Pat. No. 9,913,149 which issued on Mar. 16, 2018), which is a continuation of U.S. application Ser. No. 15/017,794 filed Feb. 8, 2016, (now patented as U.S. Pat. No. 9,503,912 which issued on Nov. 22, 2016), which is a continuation of U.S. application Ser. No. 14/681,429 filed Apr. 8, 2015, (now patented as U.S. Pat. No. 9,294,933 which issued on Mar. 22, 2016), which is a continuation of U.S. application Ser. No. 13/832,385 filed Mar. 15, 2013 (now patented as U.S. Pat. No. 9,008,669 which issued on Apr. 14, 2015), the entire contents of which are hereby incorporated herein by reference.

TECHNICAL FIELD

Example embodiments generally relate to wireless communications and, more particularly, relate to employing wedge shaped cells to provide continuous wireless communication at various distances and altitudes.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people generally understand that easy and/or cheap connectivity will tend to stop once an aircraft is boarded. Aviation platforms have still not become easily and cheaply connected to communication networks, at least for the passengers onboard. Attempts to stay connected in the air are typically costly and have bandwidth limitations or high latency problems. Moreover, passengers willing to deal with the expense and issues presented by aircraft communication capabilities are often limited to very specific communication modes that are supported by the rigid communication architecture provided on the aircraft.

Conventional ground based wireless communications systems use vertical antennas to provide coverage for device connectivity. Antennas used in terrestrial systems typically provide coverage in the azimuthal, or horizontal, plane with a width of 65 to 90 degrees. The elevation, or vertical, pattern is typically more narrow in order to maximize the antenna performance in the horizontal plane, which can result in a larger coverage area, increased signal strength or clarity in the coverage area, etc. With focus on the horizontal plane, however, these existing antennas may be unable to support connectivity for aircraft traveling above an elevation of the coverage area.

BRIEF SUMMARY OF SOME EXAMPLES

The continuous advancement of wireless technologies offers new opportunities to provide wireless coverage for aircraft at varying elevations using multiple antennas installed at certain sites. A plurality of antennas at a base station can each transmit signals having a radiation pattern defined between two elevation angles resulting in an increasing vertical beam width and smaller azimuth to form a wedge shaped sector. These wedge shaped sectors may then be overlapped with each other to progressively build in altitude for providing communications with continuous coverage at high altitudes. In one example, the plurality of antennas are configured at the base station such that corresponding wedge shaped sectors are adjacent in a horizontal plane to form a substantially semicircular coverage area in the horizontal plane that achieves at least a predetermined altitude within a predetermined distance from the base station. In addition, multiple deployed base stations can be substantially aligned in a first direction while substantially offset in a second direction. Moreover, a distance between the deployed base stations in the first direction can be less than the distance between the base stations in the second direction to facilitate providing continuous coverage up to the predetermined altitude based on the wedge shaped sectors.

In the first direction, the base stations can be aligned and deployed at a distance such that the wedge shaped sectors of a first base station are overlapped by the wedge shaped sectors of a second base station behind the first base station along the first direction. This allows the sectors of the second base station to cover altitudes up to the predetermined altitude at the location of the first base station and extending therebeyond in the first direction for a predetermined distance from the first base station until the sectors of the first base station reach the predetermined altitude. In the second direction, the base stations can be offset and deployed at a distance such to allow continuous coverage based on a horizontal plane coverage area of the sectors, as the coverage area is compensated for altitude deficiencies in the first direction, and thus may not need to be compensated by adjacent coverage areas in the second direction.

In one example embodiment, a network for providing air-to-ground (ATG) wireless communication in various cells is provided. The network includes a first base station array, each base station of which includes a respective first antenna array defining a directional radiation pattern that is oriented in a first direction, wherein each base station of the first base station array is disposed spaced apart from another base station of the first base station array along the first direction by a first distance. The network also includes a second base station array, each base station of which includes a respective second antenna array defining a directional radiation pattern that is oriented in the first direction, wherein each base station of the second base station array is disposed spaced apart from another base station of the second base station array along the first direction by the first distance, and wherein the second base station array extends substantially parallel to the first base station array and is spaced apart from the first base station array by a second distance to form continuous and at least partially overlapping cell coverage areas between respective base stations of the first and second base station arrays. Base stations of the first base station array and the second base station array are disposed to be located offset from each other along the first direction by a third distance, and wherein the first distance is less than the second distance.

In another example embodiment, a network for providing ATG wireless communication in various cells is provided. The network includes a first base station having a first antenna array providing a directional radiation pattern oriented along a first direction, the directional radiation pattern extending over a predetermined range in azimuth centered on the first direction, and extending between a first elevation angle and a second elevation angle over at least a predetermined distance to define a substantially wedge shaped radiation pattern. The network also includes a second base station deployed spaced apart from the first base station by a first distance in the first direction, the second base station having a second antenna array having the same directional radiation pattern as the first antenna array such that coverage areas of the first and second antenna arrays overlap at different altitude ranges moving along the first direction from the second base station. The network further includes a third base station deployed spaced apart from the second base station by the first distance along the first direction, the third base station having a third antenna array having the same directional radiation pattern as the first and second antenna arrays such that coverage areas of the first, second and third antenna arrays overlap at different altitude ranges moving along the first direction from the third base station to achieve continuous coverage to a predetermined altitude.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
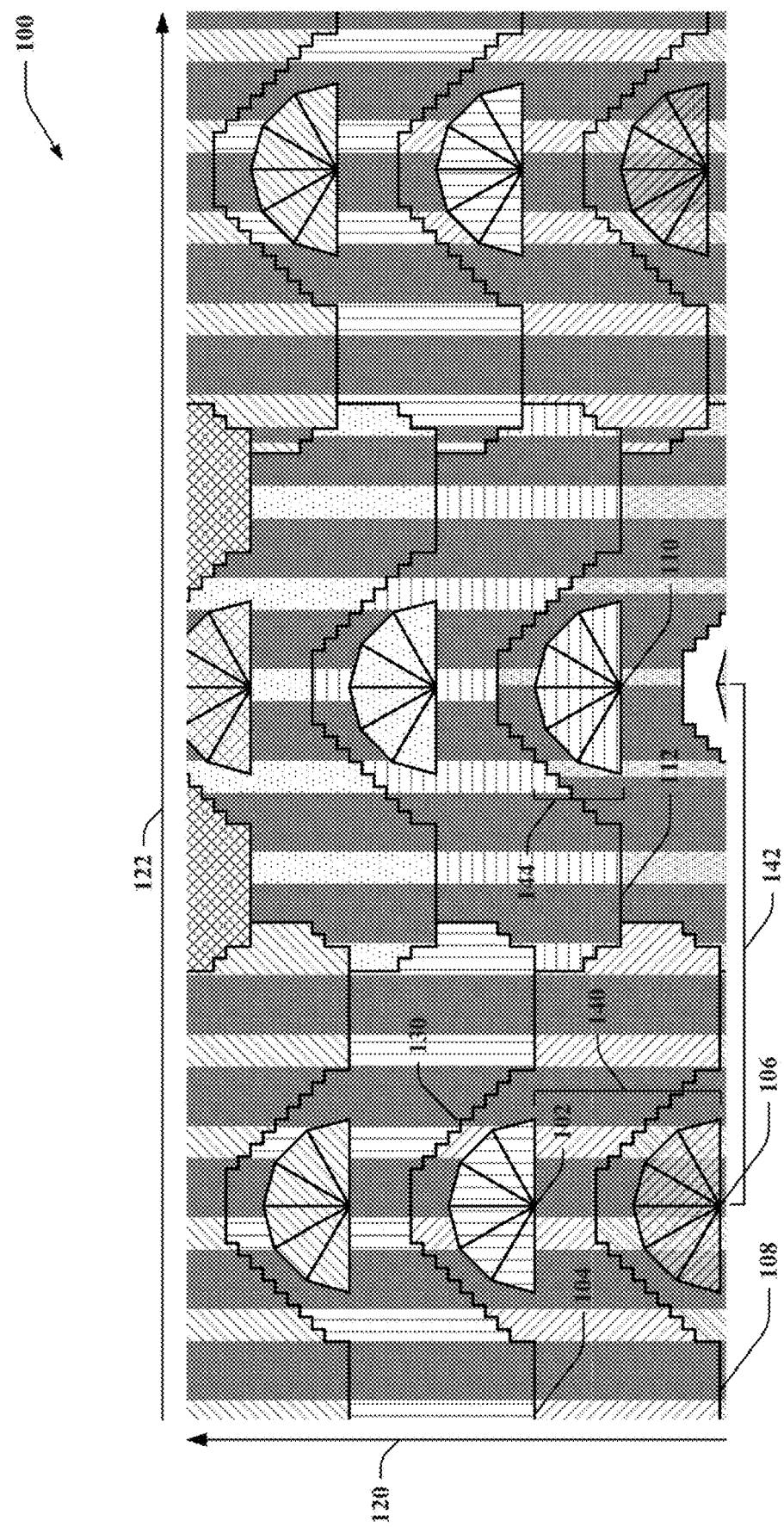
FIG. 1 illustrates a top view of an example network deployment providing air-to-ground (ATG) wireless communication coverage areas.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals may be used to refer to like elements throughout. Furthermore, as used herein, the term "or" is to be interpreted as a logical operator that results in true whenever one or more of its operands are true.

Some example embodiments described herein provide architectures for improved air-to-ground (ATG) wireless communication performance. In this regard, some example embodiments may provide for base stations having antenna structures that facilitate providing wireless communication coverage in vertical and horizontal planes with sufficient elevation to communicate with aircraft at high elevations. A base station can provide a wedge shaped cell coverage area in a vertical plane that achieves coverage at a predetermined altitude within a predetermined distance from the base station to facilitate ATG wireless communications. The cell coverage area can be substantially semicircular in the horizontal plane, and can be provided by multiple antennas each providing a wedge shaped sector over a portion of the semicircular azimuth. The base stations can be deployed as substantially aligned in a first direction while offset in a second direction. For example, the base stations can also be deployed in the first direction at a first distance to provide coverage overlapping in elevation to achieve coverage over the predetermined altitude, and within a second distance in the second direction based on an achievable coverage area distance of the sectors.

FIG. 1 illustrates a top view of a network 100 of deployed base stations for providing ATG wireless communication coverage. Network 100 includes various base stations providing substantially semicircular cell coverage areas. The cell coverage areas are each depicted in two portions. For example, the cell coverage area for a first base station is shown as similarly patterned portions 102 and 104. The portions 102 and 104 represent a single continuous cell coverage area over a horizontal plane; however, FIG. 1 depicts intervening portion 108 of another cell coverage area as providing overlapping coverage to achieve continuous coverage up to a predetermined altitude, as described further herein. Portion 102 is shown to represent the initial cell coverage area from the location of the corresponding base station out to an arbitrary distance for illustrative purposes; it is to be appreciated that this portion 102 also includes the overlapping coverage of portion 108 of another cell coverage area to achieve coverage at the predetermined altitude. Moreover, the coverage area represented by portions 106 and 108 may extend beyond boundary 130 of coverage area portion 104; the coverage areas are limited in the depiction to illustrate at least one point where the bordering coverage areas are able to provide ATG wireless communication coverage at the predetermined altitude. Further, the base stations are not depicted for ease of explanation, but it is to be appreciated that the base stations can be located such to provide the cell coverage area indicated by portions 102 and 104, portions 106 and 108, portions 110 and 112, etc.

The cell coverage areas 102/104 and 106/108 can be provided by respective base stations in a first base station array, where the base stations of one or more base station arrays are substantially aligned in a first direction 120 (as depicted by the representative cell coverage areas). As shown, cell coverage areas 102/104 and 106/108 project a directional radiation pattern that is oriented in the first direction, and are aligned front to back along the first direction. Such alignment can be achieved by substantially aligning base stations in the base station array to provide the substantially aligned cell coverage areas, antenna rotation to achieve alignment in the cell coverage areas in the first direction 120, and/or the like. As described, in this regard, a first base station that provides cell coverage area 102/104 can be overlapped by at least a cell coverage area 106/108 of a second base station in front of the first base station in the first direction 120. For example, a base station, or antennas thereof, can provide wedge shaped cell coverage areas defined by multiple elevation angles employed by antennas transmitting signals to achieve a predetermined altitude by a certain distance from the base station. Thus, overlapping the cell coverage areas in the first direction 120 allows cell coverage area 106/108 to achieve the predetermined altitude for at least the certain distance between the base station providing cell coverage area 102/104 and a point along line 130 where the cell coverage area 102/104 achieves the predetermined altitude.

In addition, base stations in the first base station array providing cell coverage areas 102/104 and 106/108 can be spaced apart in a second direction 122 from base stations of a second base station array, which can provide additional cell coverage areas 110/112, 114/116, etc., aligned in the first direction 120. The first and second base station arrays can extend substantially parallel to each other in the first direction 120. In addition, base stations of the second base station array can be offset from base stations of the first base station array in the first direction 120 (as depicted by the representative cell coverage areas). The second direction 122 can be substantially perpendicular to the first direction 120 in one example. In this example, the first and second base station arrays can be offset to provide the offsetting of respective cell coverage areas (e.g., the offset shown between cell coverage areas 102/104 and 110/112), and any other coverage areas of the base station arrays aligned in the first direction 120.

The first and second base station arrays can be spaced apart at a greater distance in the second direction 122 than base stations within the respective arrays spaced apart in the first direction 120. For example, the base stations can be spaced in the second direction 122 according to an achievable coverage distance of the base station providing the cell coverage areas. Because the base stations providing cell coverage areas 102/104 and 106/108 in the first base station array are aligned in the first direction 120 such that cell coverage area 106/108 provides overlapping coverage to cell coverage area 102/104 to achieve the predetermined altitude, the base station arrays themselves can be separated based on the achievable distance of the respective cell coverage areas 102/104 and 110/112. In this regard, no substantial overlapping is needed between the boundaries of cell coverage areas 102/104 and 110/112 provided by base stations of adjacent base station arrays to reach the predetermined altitude since the altitude deficiencies near the respective base stations are covered by cell coverage areas of base stations in the base station array aligned in the first direction 120.

Moreover, offsetting the base stations providing the various cell coverage areas over the second direction 122 can allow for further spacing in the first direction 120 and/or second direction 122 as the end portions of one cell coverage area in the horizontal plane can abut to a middle portion of another cell coverage area from a base station in an adjacent base station array to maximize the distance allowed between the cell coverage areas while maintaining continuous coverage, which can lower the number of base stations necessary to provide coverage over a given area. In one example, the spacing in the second direction 122 can be more than twice the spacing in the first direction 120, depending on the coverage distance of the cell coverage areas and the distance over which it takes a cell coverage area to reach the predetermined altitude.

As depicted, the spacing of a first distance between base stations in a given base station array can be indicated as distance 140 in the first direction 120. The spacing of a second distance between base station arrays in the second direction 122 can be indicated as distance 142. Moreover, the offset between the base station arrays can be indicated as a third distance 144. In one specific example, the distance 140 can be near 150 kilometers (km), where distance 142 between the base stations providing cell coverage area 102/104 can be 400 km or more. In this example, the achievable cell coverage areas can be at least 200 km from the corresponding base station in the direction of the transmitted signals that form the coverage areas or related sectors thereof. Moreover, in this example, the distance 144 can be around 75 km.

In an example, the base stations providing cell coverage areas 102/104, 106/108, 110/112, etc. can each include respective antenna arrays defining a directional radiation pattern oriented in the first direction. The respective antenna arrays can include multiple antennas providing a sector portion of the radiation pattern resulting in a coverage area that is wedge shaped in the vertical plane. For example, the cell coverage area provided by each antenna can have first and second elevation angles that exhibit an increasing vertical beam width in the vertical plane, and fills a portion of an azimuth in the horizontal plane. Using more concentrated signals that provide smaller portions of the azimuth can allow for achieving further distance and/or increased elevation angles without increasing transmission power. In the depicted example, the cell coverage areas defined by the antenna arrays include six substantially 30 degree azimuth sectors that are substantially adjacent to form a directional radiation pattern extending substantially 180 degrees in azimuth centered on the first direction to define the semicircular coverage area. Each sector can be provided by an antenna at the corresponding base station, for example. Moreover, in one example, the base station can have a radio per antenna, a less number of radios with one or more switches to switch between the antennas to conserve radio resources, and/or the like, as described further herein. It is to be appreciated that additional or a less number of sectors can be provided. In addition, the sectors can have an azimuth more or less than 30 degrees and/or can form a larger or smaller total cell coverage area azimuth than the depicted semicircular cell coverage area.

In yet other examples, the network 100 can implement frequency reuse of two such that adjacent base stations can use alternating channels in providing the cell coverage areas. For example, a base station providing cell coverage areas 102/104 can use a first channel, and a base station providing cell coverage area 106/108 in the same base station array can use a second channel. Similarly, the base station providing cell coverage area 110/112 in a different base station array can use the second channel, etc. It is to be appreciated that other frequency reuse patterns and/or number of reuse factors can be utilized in this scheme to provide frequency diversity between adjacent cell coverage areas.

Furthermore, in an example deployment of network 100, the first direction 120 and/or second direction 122 can be, or be near, a cardinal direction (e.g., north, south, east, or west), an intermediate direction (e.g., northeast, northwest, southeast, southwest, north-northeast, east-northeast, etc.), and/or the like on a horizontal plane. In addition, the network 100 can be deployed within boundaries of a country, boundaries of an air corridor across one or more countries, and/or the like. In one example, cell coverage area 106/108 can be provided by an initial base station at a border of a country or air corridor. In this example, a base station providing cell coverage area 106/108, 110/112, and/or additional cell coverage areas at the border, can include one or more patch antennas to provide coverage at the predetermined altitude from the distance between the base station to the point where the respective cell coverage area 106/108, 110/112, etc. reaches the predetermined altitude. For example, the one or more patch antennas can be present behind the cell coverage areas 106/108, 110/112, etc., and/or on the base stations thereof (e.g., as one or more antennas angled at an uptilt and/or parallel to the horizon) to provide cell coverage up to the predetermined altitude.

Figure 2:
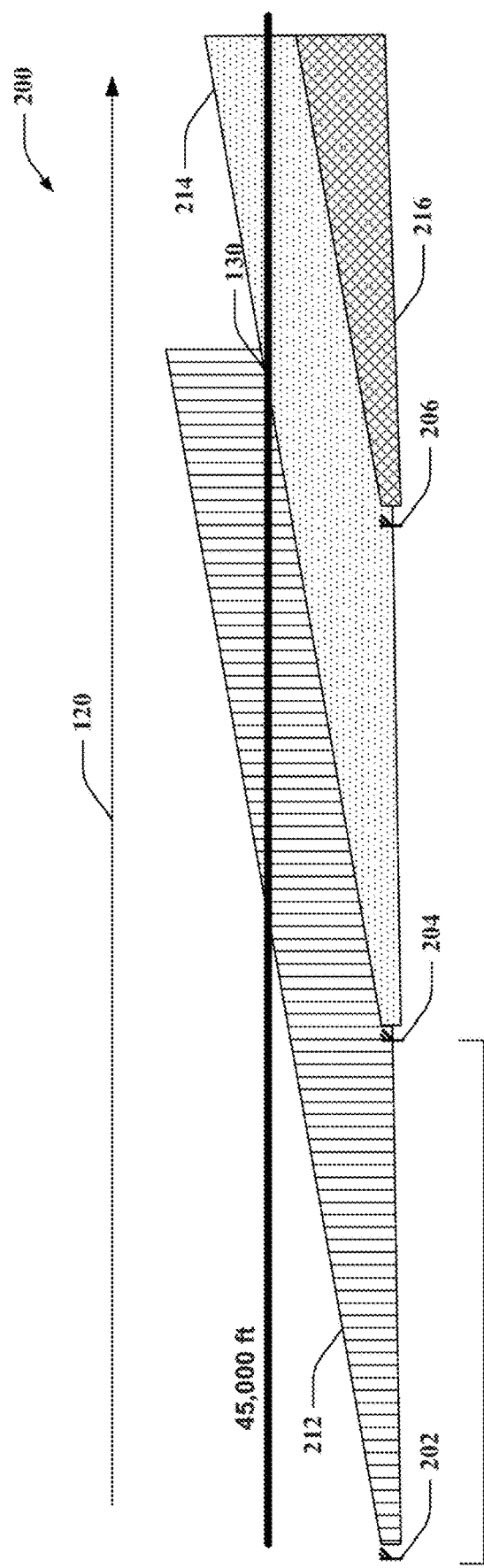
FIG. 2 illustrates an aspect of an example network deployment of base stations providing overlapping cell coverage areas to achieve coverage up to a predetermined altitude.

FIG. 2 illustrates an example network 200 for providing overlapping cells to facilitate ATG wireless communication coverage at least at a predetermined altitude. Network 200 includes base stations 202, 204, and 206 that transmit signals for providing the ATG wireless communications. Base stations 202, 204, and 206 can each transmit signals that exhibit a radiation pattern defined by a first and second elevation angle such to achieve a predetermined altitude. In this example, base stations 202, 204, and 206 provide respective wedge shaped cell coverage areas 212, 214, and 216. The base stations 202, 204, and 206 can be deployed as substantially aligned in a first direction 120 as part of the same base station array, as described above, or to otherwise allow for aligning the cell coverage areas 212, 214, and 216 in the first direction, such that cell coverage area 212 can overlap cell coverage area 214 (and/or 216 at a different altitude range in the vertical plane), cell coverage area 214 can overlap cell coverage area 216, and so on. This can allow the cell coverage areas 212, 214, and 216 to achieve at least a predetermined altitude (e.g., 45,000 feet (ft)) for a distance defined by the various aligned base stations 202, 204, 206, etc.

As depicted, base station 202 can provide cell coverage area 212 that overlaps cell coverage area 214 of base station 204 to facilitate providing cell coverage up to 45,000 ft near base station 204 for a distance until signals transmitted by base station 204 reach the predetermined altitude of 45,000 ft (e.g., near point 130), in this example. In this example, base station 204 can be deployed at a position corresponding to the distance between which it takes cell coverage area 214 of base station 204 to reach the predetermined altitude subtracted from the achievable distance of cell coverage area 212 of base station 202. In this regard, there can be substantially any number of overlapping cell coverage areas of different base stations to reach the predetermined altitude based on the elevation angles, the distance it takes to achieve a vertical beam width at the predetermined altitude based on the elevation angles, the distance between the base stations, etc.

In one specific example, the base stations 202, 204, and 206 can be spaced apart by a first distance 140, as described. The first distance 140 can be substantially 150 km along the first direction 120, such that base station 204 is around 150 km from base station 202, and base station 206 is around 300 km from base station 202. Further, in an example, an aircraft flying between base station 206 and 204 may be covered by base station 202 depending on its altitude, and in one example, altitude can be used in determining whether and/or when to handover a device on the aircraft to another base station or cell provided by the base station.

Moreover, as described in some examples, base stations 202, 204 and 206 can include an antenna array providing a directional radiation pattern oriented along the first direction 120, as shown in FIG. 1, where the directional radiation pattern extends over a predetermined range in azimuth centered on the first direction 120, and extends between the first elevation angle and the second elevation angle of the respective coverage areas 212, 214, and 216 over at least a predetermined distance to define the substantially wedge shaped radiation pattern. In this regard, FIG. 2 depicts a side view of a vertical plane of the base stations 202, 204, and 206, and associated coverage areas 212, 214, and 216. Thus, in one example, base station 202 can provide a cell coverage area 212 that is similar to cell coverage area 106/108 in FIG. 1 in a horizontal plane, and base station 204 can provide a cell coverage area 214 similar to cell coverage area 102/104 in FIG. 1. Moreover, as described, direction 120 can correlate to a cardinal direction, intermediate direction, and/or the like. In addition, in a deployment of network 200, additional base stations can be provided in front of base station 206 along direction 120 until a desired coverage area is provided (e.g., until an edge of a border or air corridor is reached).

Figure 3:
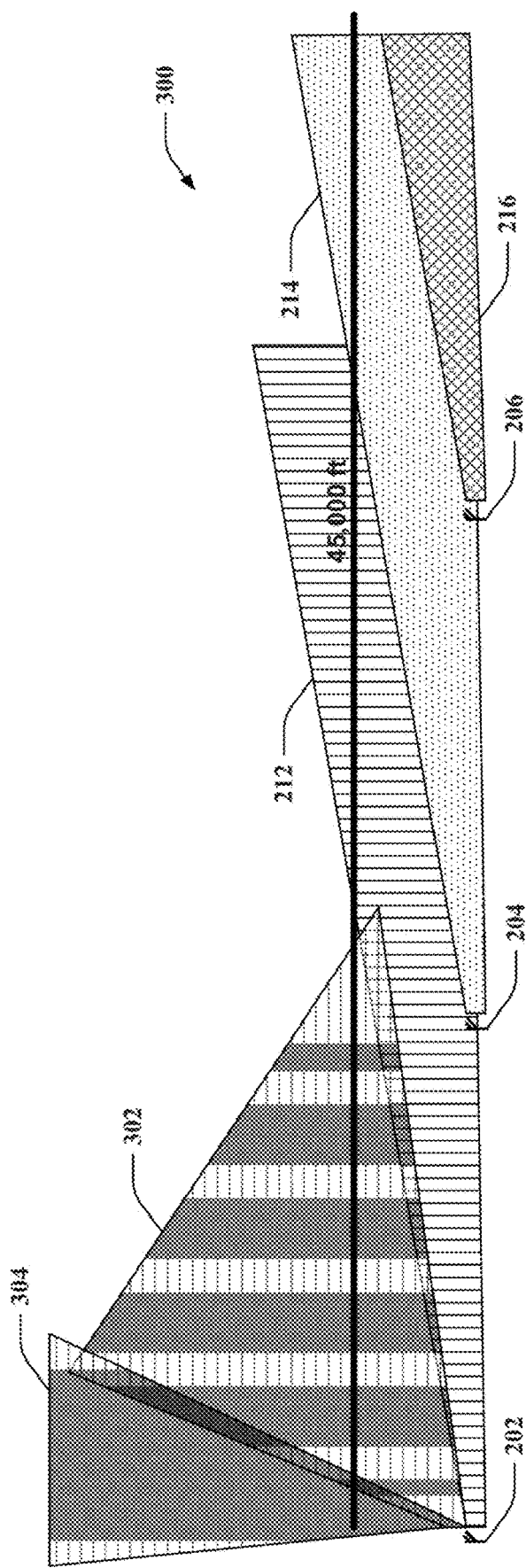
FIG. 3 illustrates an aspect of an example network deployment of base stations providing overlapping cell coverage areas and/or additional coverage areas.

FIG. 3 illustrates an example network 300 for providing overlapping cells to facilitate ATG wireless communication coverage at least at a predetermined altitude, as in FIG. 2. Network 300, thus, includes base stations 202, 204, and 206 that transmit signals for providing the ATG wireless communications. Base stations 202, 204, and 206 can each transmit signals that exhibit a radiation pattern defined by a first and second elevation angle such to achieve a predetermined altitude. This results in providing respective wedge shaped cell coverage areas 212, 214, and 216. The base stations 202, 204, and 206 can be deployed as substantially aligned in a first direction as part of the same base station array, as described above, or to otherwise allow for aligning the cell coverage areas 212, 214, and 216 in the first direction, such that cell coverage area 212 can overlap cell coverage area 214 (and/or 216), cell coverage area 214 can overlap cell coverage area 216, and so on. This can allow the cell coverage areas 212, 214, and 216 to achieve at least a predetermined altitude (e.g., 45,000 ft) for a distance defined by the various aligned base stations 202, 204, 206, etc., as described.

In addition, however, base station 202 can be deployed at an edge of a desired coverage area, and can include one or more patch antennas to provide additional ATG wireless communication coverage. In an example, the edge of the desired coverage area can include a border of a country, an edge of an air corridor, etc. For example, the one or more patch antennas can be provided at an uptilt angle and/or with additional elevation as compared to antenna(s) providing cell coverage area 202. In one example, at least one patch antenna can provide additional coverage areas 302 and/or 304 up to the target altitude to fill coverage gaps near the border or edge in the network deployment configuration described herein, for example.

Figure 4:
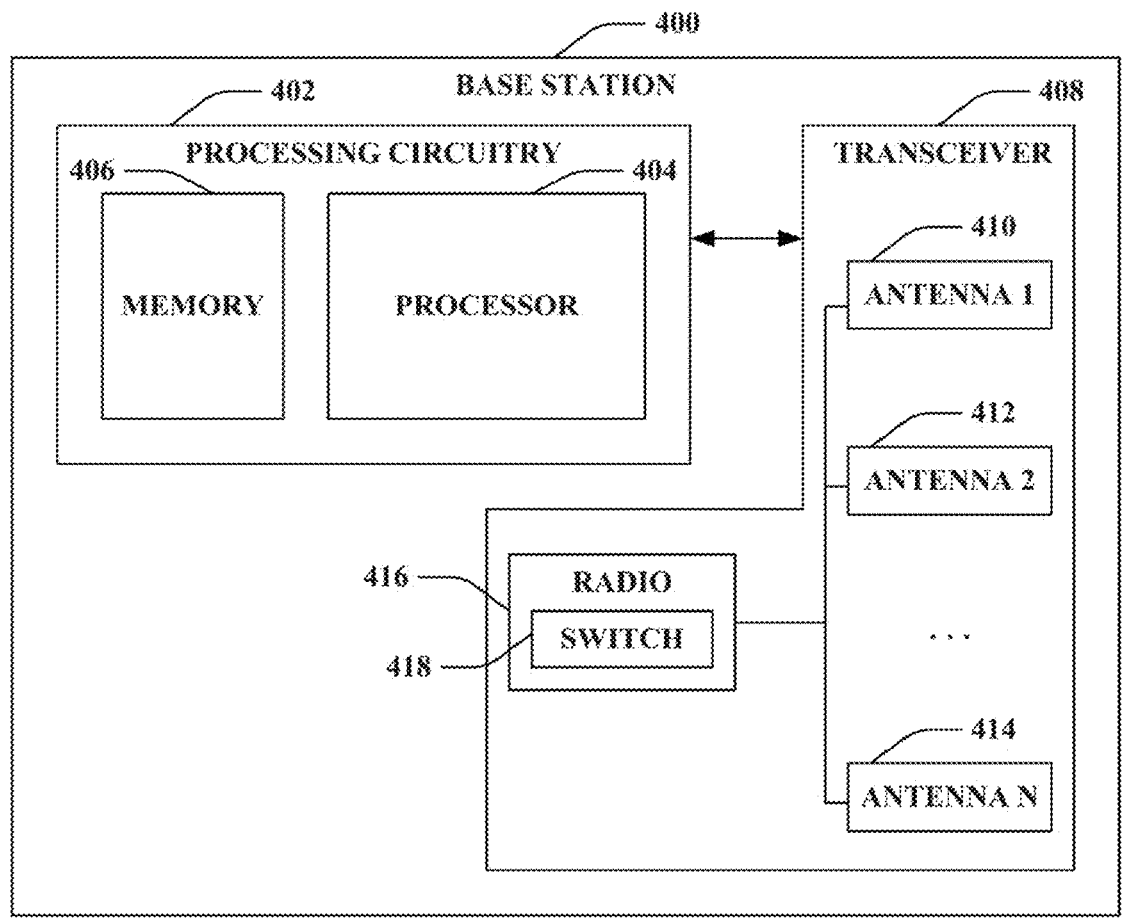
FIG. 4 illustrates a functional block diagram of a base station of an example embodiment.

FIG. 4 illustrates a functional block diagram of a base station 400 in an example embodiment. In this regard, for example, the base station 400 may include processing circuitry 402 that may be configurable to perform control functions in accordance with example embodiments. The processing circuitry 402 may provide electronic control inputs to one or more functional units of an aircraft for providing ATG wireless communications thereto. The processing circuitry 402 may be configured to perform data processing, control function execution and/or other processing and management services according to an example embodiment.

In some examples, the processing circuitry 402 may be embodied as a chip or chip set. In other words, the processing circuitry 402 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 402 may therefore, in some cases, be configured to implement an embodiment of the disclosed subject matter on a single chip or as a single "system on a chip." As such, in some cases, a chip or chipset may constitute means for performing one or more operations for providing the functionalities described herein.

In an example embodiment, the processing circuitry 402 may include one or more instances of a processor 404 and memory 406 that may be in communication with or otherwise control a transceiver 408. The processing circuitry 402 may be embodied as a circuit chip (e.g., an integrated circuit chip) configured (e.g., with hardware, software or a combination of hardware and software) to perform operations described herein. However, in some embodiments, the processing circuitry 402 may be embodied as a portion of an on-board computer. The transceiver 408 may include one or more mechanisms for enabling communication with various devices. In some cases, the transceiver 408 can include device or circuitry embodied in either hardware, or a combination of hardware and software that is configured to receive and/or transmit data from/to aircraft or other devices in communication with the processing circuitry 402. Thus, for example, the transceiver 408 may allow for communication via different antennas, such as antenna 1 410, antenna 2 412, antenna N 414, where N is a positive integer, etc.

In an example embodiment, the processing circuitry 402 may be configured to control configuration or operation of one or more instances of the transceiver 408 to facilitate operation of one or more antennas, such as antenna 1 410, antenna 2 412, antenna N 414, etc. In one example, as depicted, the antennas 410, 412, 414, etc. can be operated by a single radio 416, and the radio 416 can include a switch 418 to alternate between transmitting signals over the various antennas 410, 412, 414, etc. In another example, though not depicted, the antennas 410, 412, 414, etc. can use independent radios, and/or can transmit signals concurrently. In any case, processing circuitry 402 can use transceiver 408 to provide cell coverage via communications using the antennas 410, 412, 414, etc. to provide wedge shaped cells, as described. In addition, the wedge shaped cells provided by the antennas can be substantially adjacent in a direction to provide multiple aligned sectors that form semicircular coverage areas, as described. In some examples, transceiver 408 can employ additional patch antennas (not shown) to provide additional coverage areas to provide border coverage at the predetermined altitude.

Moreover, it is to be appreciated that the radio(s) 416 can communicate using substantially any air interface in a licensed spectrum (e.g., third generation partnership project (3GPP) long term evolution (LTE), Wideband Code Division Multiple Access (WCDMA), and/or the like), unlicensed spectrum (e.g., 2.4 gigahertz (GHz), 5.8 GHz, and/or the like), etc.

The processor 404 may be embodied in a number of different ways. For example, the processor 404 may be embodied as various processors, such as one or more of a microprocessor or other processing element, a coprocessor, a controller or various other computing or processing devices including integrated circuits such as, for example, an application specific integrated circuit (ASIC), a field programmable gate array (FPGA), or the like. In an example embodiment, the processor 402 may be configured to execute instructions stored in the memory 406 or otherwise accessible to the processor 404. As such, whether configured by hardware or by a combination of hardware and software, the processor 404 may represent an entity (e.g., physically embodied in circuitry—in the form of processing circuitry 402) capable of performing operations according to embodiments of the present invention while configured accordingly. Thus, for example, when the processor 404 is embodied as an ASIC, FPGA or the like, the processor 404 may be specifically configured hardware for conducting the operations described herein. Alternatively, as another example, when the processor 404 is embodied as an executor of software instructions, the instructions may specifically configure the processor 404 to perform the operations described herein.

In an example embodiment, the processor 404 (or the processing circuitry 402) may be embodied as, include or otherwise control the operation of the base station 400, as described herein. As such, in some embodiments, the processor 404 (or the processing circuitry 402) may be said to cause each of the operations described in connection with the base station 400 in relation to operation of the base station 400 by directing components of the transceiver 408 to undertake the corresponding functionalities responsive to execution of instructions or algorithms configuring the processor 404 (or processing circuitry 402) accordingly.

In an exemplary embodiment, the memory 406 may include one or more non-transitory memory devices such as, for example, volatile and/or non-volatile memory that may be either fixed or removable. The memory 406 may be configured to store information, data, applications, instructions or the like for enabling the processing circuitry 402 to carry out various functions in accordance with exemplary embodiments described herein. For example, the memory 406 could be configured to buffer input data for processing by the processor 404. Additionally or alternatively, the memory 406 could be configured to store instructions for execution by the processor 404. As yet another alternative, the memory 406 may include one or more databases that may store a variety of data sets related to functions described herein. Among the contents of the memory 406, applications may be stored for execution by the processor 404 in order to carry out the functionality associated with each respective application. In some cases, the applications may include instructions for recognition of various input signals related to component status or operational parameters and, if necessary, applying timing control, encryption, channel control and/or the like associated with handling the reception of such signals. The applications may further include instructions for operational control of the base station 400, as described above.

Figure 5:
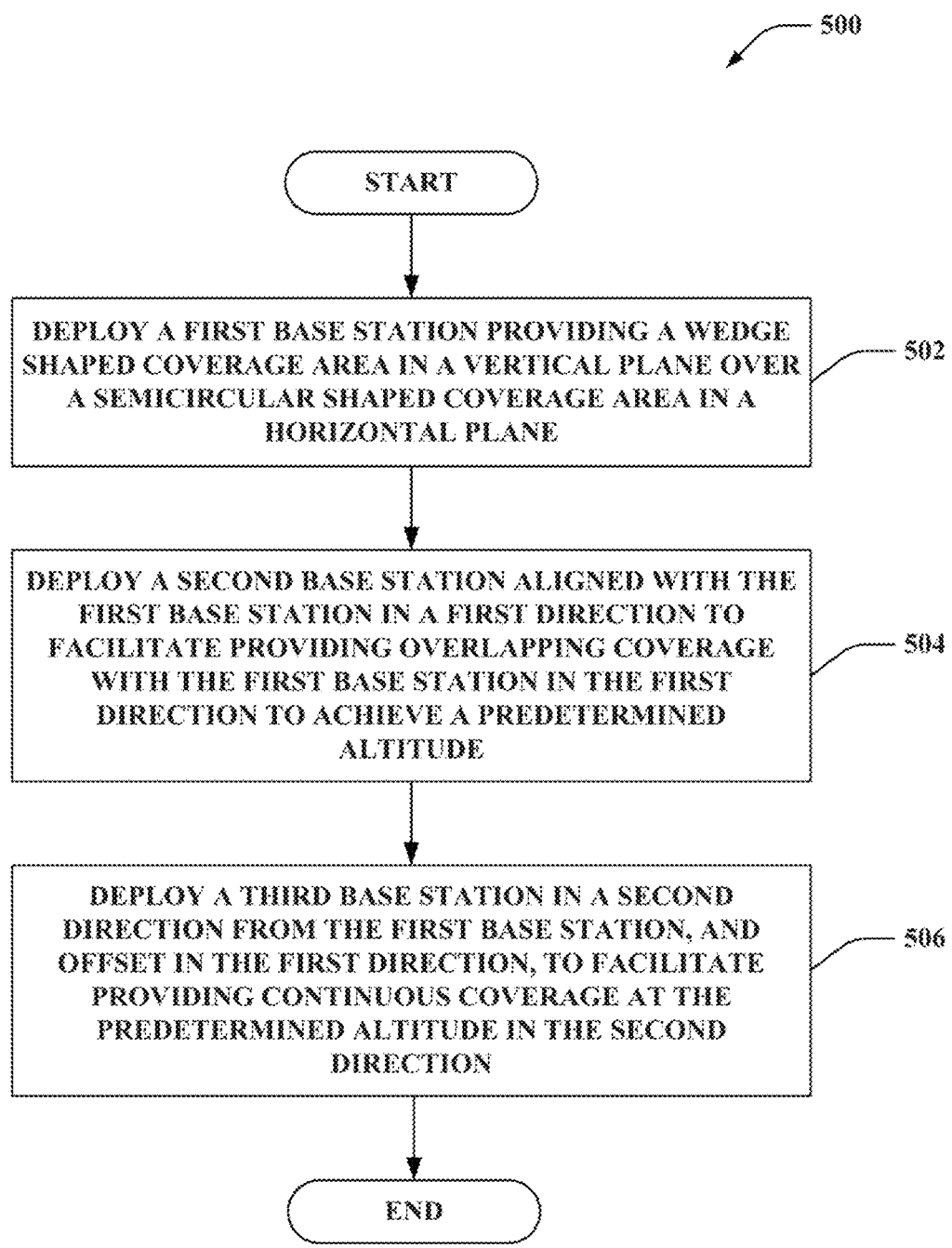
FIG. 5 illustrates an example methodology for deploying base stations to provide ATG wireless communications at a predetermined altitude.

Referring to FIG. 5, a methodology that can be utilized in accordance with various aspects described herein is illustrated. While, for purposes of simplicity of explanation, the methodology is shown and described as a series of acts, it is to be understood and appreciated that the methodology is not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

FIG. 5 illustrates an example methodology 500 for providing deploying a plurality of base stations to provide ATG wireless communication coverage areas. At 502, a first base station is deployed providing a wedge shaped coverage area in a vertical plane over a semicircular shaped coverage area in a horizontal plane. As described, an increasing vertical beam width over a distance, as effectuated by multiple elevation angles of signal transmissions by the base station, can result in the wedge shape of the coverage area. In addition, the semicircular shape in the horizontal plane can be effectuated by an azimuth of transmission by one or more antennas. As described, in an example, transmissions from a plurality of antennas can form substantially adjacent sectors that together form the semicircular shaped cell coverage area.

At 504, a second base station can be deployed aligned with the first base station in a first direction to facilitate providing overlapping coverage with the first base station in the first direction to achieve a predetermined altitude. In this regard, as described, a second cell coverage area of the second base station can be similarly shaped in the vertical and horizontal planes as the cell coverage area of the first base station, such that the second cell coverage area can fill coverage gaps in the cell coverage area near the first base station up to a predetermined altitude in a semicircular coverage area shape in the horizontal plane. In this example, the second base station can be deployed at a distance that allows the second base station to cover the cell coverage area of the first base station at least at the predetermined altitude and at least to a point where the cell coverage area of the first base station reaches the predetermined altitude. Moreover, as described, the first and second base stations can be deployed in the same base station array.

At 506, a third base station can be deployed in a second direction from the first base station, and offset in the first direction, to facilitate providing continuous coverage at the predetermined altitude in the second direction. The second direction can be substantially perpendicular to the first direction such that the third base station is deployed based on an achievable cell coverage area distance by the first base station and the third base station. As described, since the cell coverage area of the first base station is compensated for altitude deficiency in the first direction (e.g., by the overlapping cells of the second base station aligned in the first direction), no such compensation is needed in the second direction, and thus the base stations in the second direction can be further spaced apart based on the achievable coverage area distance of each base station. Moreover, as described, the third base station can be deployed in a base station array adjacent to the base station array to which the first and second base stations are associated.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A base station in a network for providing air-to-ground (ATG) wireless communication in various cells, comprising:
    a plurality of antennas associated with respective sectors; and
    processing circuitry configured to control operation of the antennas,
    wherein the antennas define a first directional radiation pattern extending away from the antennas and increasing in vertical beam width as distance increases in each of the respective sectors, the first directional radiation pattern concentrating signals transmitted toward the horizon;
    wherein the first directional radiation pattern overlaps with at least one second directional radiation pattern of an adjacent base station to define a coverage area for aircraft in the first or second directional radiation patterns up to a predetermined altitude,
    wherein the base station is configured to wirelessly communicate with a radio disposed on an aircraft flying through one of the respective sectors while the aircraft is located inside the first directional radiation pattern, and coordinate with the adjacent base station to enable the adjacent base station to communicate with the radio while the aircraft is located inside the at least one second directional radiation pattern of the adjacent base station.

2. The base station of claim 1, wherein at least one of the first directional radiation pattern or the second direction radiation pattern defines a substantially wedge shaped radiation pattern.

3. The base station of claim 2, wherein the first and second directional radiation patterns overlap each other to provide continuous coverage up to the predetermined altitude.

4. The base station of claim 3, wherein coverage up to the predetermined altitude immediately above the base station is provided by the adjacent base station.

5. The base station of claim 1, wherein, for any given one of the respective sectors, only the first directional radiation pattern is transmitted from the antennas.

6. The base station of claim 1, wherein the respective sectors of the base station combine to form a semicircular radiation pattern.

7. The base station of claim 6, wherein the base station comprises a single radio operated under control of the processing circuitry, the single radio controlling operation of each of the respective sectors.

8. The base station of claim 1, wherein the base station employs unlicensed spectrum and the adjacent base station employs unlicensed spectrum.

9. The base station of claim 1, wherein the base station comprises a switch configured to alternate between transmitting signals via selected ones of the antennas.

10. The base station of claim 1, wherein the base station employs unlicensed spectrum, and wherein the aircraft transitions from the first directional radiation pattern being served by the base station via the unlicensed spectrum to being served via another base station that employs licensed spectrum.

11. A network for providing air-to-ground (ATG) wireless communication in various cells, the network comprising:
- a first base station having a plurality of antennas associated with respective sectors, and processing circuitry configured to control operation of the antennas, the antennas of the first base station defining a first directional radiation pattern extending away from the antennas and increasing in vertical beam width as distance increases in each of the respective sectors, the first directional radiation pattern concentrating signals transmitted toward the horizon; and
- a second base station defining a second directional radiation pattern,
- wherein the first directional radiation pattern overlaps with the second directional radiation pattern,
- wherein the first base station is configured to wirelessly communicate with a radio disposed on an aircraft flying through one of the respective sectors, and
- wherein the first base station is configured to coordinate with the second base station to enable the second base station to communicate with the radio while the aircraft is located inside the second directional radiation pattern of the second base station.

12. The network of claim 11, wherein at least one of the first directional radiation pattern or the second direction radiation pattern defines a substantially wedge shaped radiation pattern.

13. The network of claim 12, wherein the first and second directional radiation patterns overlap each other to provide continuous coverage up to a predetermined altitude.

14. The network of claim 13, wherein coverage up to the predetermined altitude immediately above the first base station is provided by the second base station.

15. The network of claim 11, wherein, for any given one of the respective sectors, only the first directional radiation pattern is transmitted from the antennas.

16. The network of claim 11, wherein the respective sectors of the first base station combine to form a semicircular radiation pattern.

17. The network of claim 16, wherein the first base station comprises a single radio operated under control of the processing circuitry, the single radio controlling operation of each of the respective sectors.

18. The network of claim 11, wherein the first base station employs unlicensed spectrum and the second base station employs licensed spectrum.

19. The network of claim 11, wherein the first base station comprises a switch configured to alternate between transmitting signals via selected ones of the antennas.

20. The network of claim 11, wherein the first base station employs unlicensed spectrum and the second base station employs unlicensed spectrum.

* * * * *